E. P. ELZEY.
MOTOR VEHICLE STEERING WHEEL.
APPLICATION FILED DEC..23, 1920.

1,430,733.  Patented Oct. 3, 1922.

E. P. Elzey INVENTOR.

BY

Hubert Cook ATTORNEY.

Patented Oct. 3, 1922.

1,430,733

UNITED STATES PATENT OFFICE.

EDGAR P. ELZEY, OF PARKERSBURG, WEST VIRGINIA.

MOTOR-VEHICLE STEERING WHEEL.

Application filed December 23, 1920. Serial No. 432,677.

*To all whom it may concern:*

Be it known that I, EDGAR P. ELZEY, a citizen of the United States of America, and resident of Parkersburg, Wood County, State of West Virginia, have invented certain new and useful Improvements in Motor-Vehicle Steering Wheels, of which the following is a specification.

This invention relates to certain improvements in wheels or handles for controlling motor vehicle steering gear; and the objects and nature of the invention will be readily understood by those skilled in the art in the light of the following explanation of the accompanying drawings illustrating what I now believe to be the preferred mechanical expression or embodiment of the invention from among other forms, constructions and arrangements within the spirit and scope thereof.

In driving motor vehicles, particularly in long distance driving, the jar, vibration and tremor of the steering wheel or other handle is mainly responsible for the driver's fatigue and muscle cramps; and it is an object of this invention to provide improved means for reducing to the minimum transmission of such vibrations, jars and tremors to the hands and arms of the driver, in other words, to provide means for insulating the driver's hands against the so-called "sting" of the steering wheel tremors and jars.

With this and other objects in view, the invention consists in certain novel features in construction, arrangements, and combinations as more fully and particularly set forth and specified hereinafter.

Referring to the accompanying drawings:—

Figure 1:
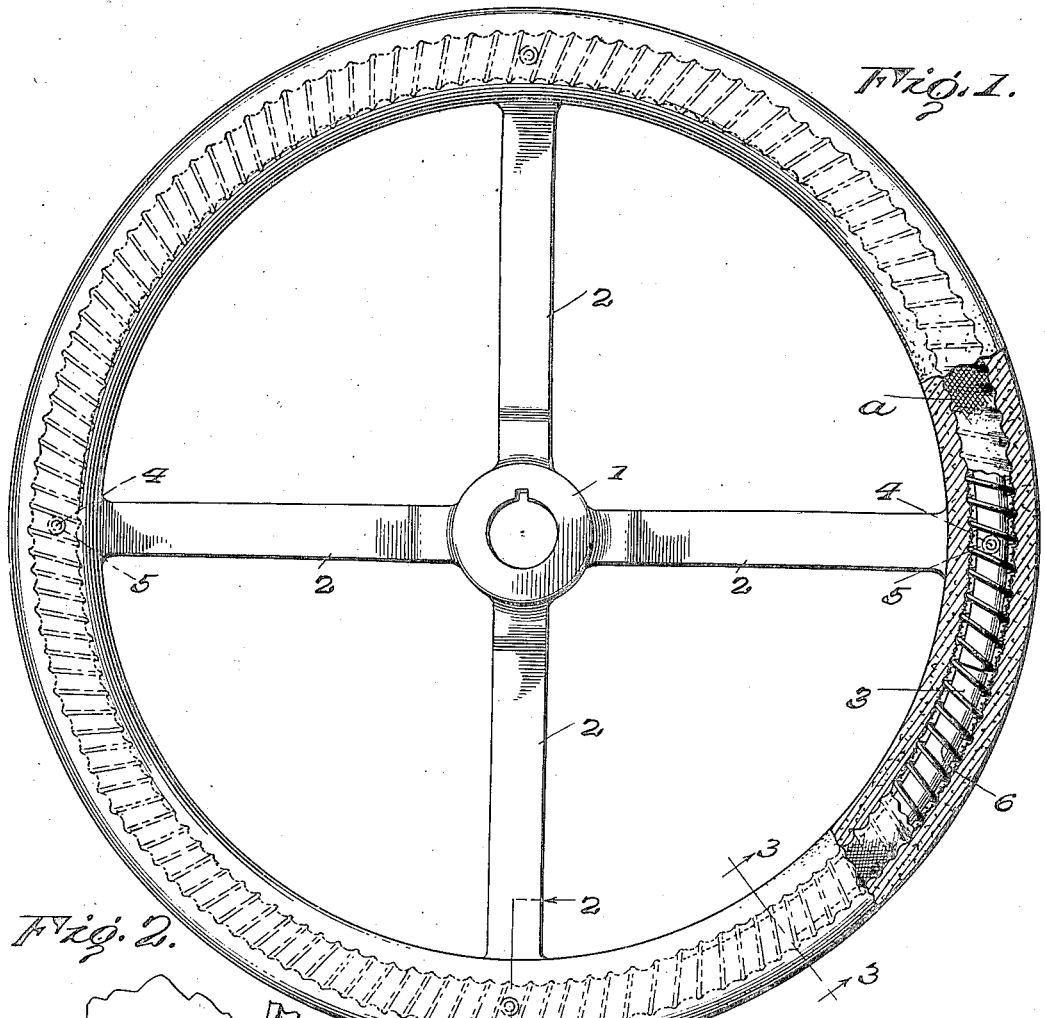
Fig. 1 is a plan of a steering wheel illustrating one, from among other, embodiments of my invention; a portion of the wheel being shown in horizontal section, dotted lines indicating the coiled spring and the rigid ring or annulus of the wheel.
Figure 2:
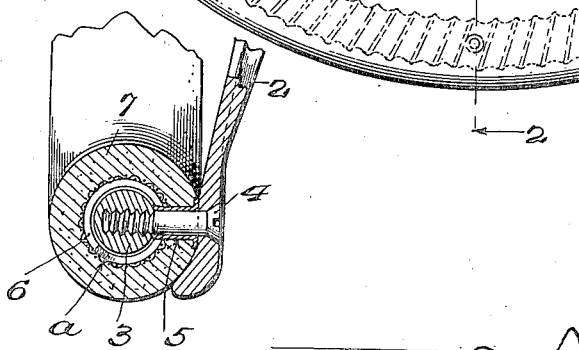
Fig. 2 is a section on the line 2—2, Fig. 1.
Figure 3:
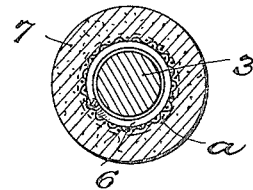
Fig. 3 is a section on the line 3—3, Fig. 1.

In the particular example illustrated, the steering wheel or handle embodies the usual (or any suitable) spider having hub 1 to receive and be fixed to the steering post and radial arms 2 carrying the rim of the wheel or that portion thereof that is in action gripped by the hands of the operator.

In this particular example, although I do not wish to so limit all features of my invention, the wheel rim embodies a strong more or less rigid ring or annulus 3, usually concentric with the hub 1 and fixed to the outer ends of the spider arms 2. For instance, in this example, the ring 3 is composed of a strong metal rod bent into circular form with its ends brought together. This ring is arranged above the outer ends of arms 2 and is rigidly clamped thereto through the medium of screws 4 and spacing sleeves or bushings 5. The arm ends are perforated and the ring is formed with tapped holes, to receive the screws. The sleeves 5 are interposed between the arm ends and the ring and loosely receive the screws, so that the screws serve to tightly clamp the ring against the sleeves and the sleeves against the arms to form a strong rigid structure wherein the ring is spaced upwardly a suitable distance from the arms.

In the structure as so far described, the jars and vibrations of the steering post when the motor vehicle is traveling, are transmitted to the rim ring which in this respect corresponds to the hand grip of the common steering wheel.

My invention provides a hand hold or grip designed to absorb the jars and vibrations of the rim ring and insulate the operator's hands therefrom. For instance, I show the rim ring loosely surrounded by a compression spring 6 coiled into cylindrical form. This spring as an entirety forms an annulus that is approximately continuous around the rim ring, although I do not wish to so limit all features of my invention. The compression spring is arranged within and surrounded by an exterior cushioning tube or body 7 that constitutes the hand grip per se of the wheel. This body 7 is composed in whole or in part of rubber or its equivalent.

In the example illustrated, the sleeves extend radially through the rubber tube and between convolutions of the spring, and in effect, constitute abutments for the compression spring (when the wheel is turned to the right or left by the hands grasping the rubber tube) through the medium of which wheel rotating force or motion is transmitted from the hand grip (rubber tube) to the rim ring.

The spring is formed with an interior diameter (or cross sectional dimensions)

slightly in excess of the exterior diameter of the rod forming the rim ring (or of the exterior cross sectional dimensions of said ring) so that the spring will loosely contact the exterior surface of said ring and will be capable of freely sliding longitudinally thereon, except for the radial spacing sleeves. The spring is so formed as to be open, i. e., so that its convolutions are spaced to permit compression of the spring.

If so desired, the rim ring can be enclosed within one spring, i. e., a continuous spring, although the spring can be in sections arranged between the means securing the rim ring to the spider arms.

Where I employ a continuous spring bent into annular form to occupy the rim ring throughout the complete circle thereof, the ring is usually threaded into the spring before the fastening screws and spacing sleeves are applied, by separating the ends of the rod forming the ring so that the spring can be slipped longitudinally onto the rod over one end thereof. After the spring has been applied, the ends of the rod are brought together.

The coiled spring on the rim ring is then preferably wrapped tightly with any suitable gauze or fabric $a$ (before or after the spacing screws are located on the ring in alinement with the screw sockets in the ring) so that the spring is entirely incased thereby, preferably so that the fabric is depressed inwardly between the spring convolutions. The rubber tube or hand grip 7, is then molded on the fabric $a$ so as to entirely enclose the spring and consequently the rim ring that is within the spring. The rubber preferably enters partially between the spring convolutions so far as permitted by the fabric $a$ so that the spring is in effect embedded in the rubber although the fabric and spring preferably keep the rubber from contact with the rim ring.

The spring serves as the contacting medium between the rubber tube, the hand grip, and the rim ring, and this spring takes up or absorbs the "sting" or nerve and muscle shocking vibrations of the tremors and jars of the rim ring and prevents transmission thereof to the hands grasping the hand grip.

The rubber (rubber or rubber and fabric) hand grip or enclosing body molded or otherwise permanently formed on the coiled spring can be exteriorly finished in any desired shape or form and of any desired degree of flexibility to provide the most desirable gripping surface for the hands. The rubber hand grip tends to prevent slipping of the hands thereon or of the wheel through the hands and aids in cushioning and absorbing shock.

The coiled spring when curved tends to bring the portions of its convolutions at the inner diameter of the wheel closer together than the convolution portions at the outer diameter and hence tends to prevent twisting or turning of the rubber hand grip on the rim ring as said spring is in effect embedded in the rubber body.

I do not wish to limit myself to the formation of the rim ring in one piece rather than in several sections, nor to the formation of the coil spring in one piece rather than in sections, nor in fact to the formation of the rubber hand grip in one piece rather than in sections, nor to the particular spider and rim (rim ring) formations disclosed, nor to the particular means disclosed for fastening the rim ring to the spider arms, and it is evident that various changes, variations and departures might be resorted to without departing from the spirit and scope of my invention, and hence I do not wish to limit myself to the exact disclosure hereof nor to the use thereof on a handle of wheel form.

What I claim is:—

1. A handle comprising a main frame or body subject to tremors and jars when in normal operative relation and action, a coiled spring and a hand grip of cushioning material mounted on and enclosing said spring, said spring surrounding and loosely contacting said body to absorb such tremors and jars.

2. A handle having a main body, and a rubber hand grip surrounding the same and provided with and surrounding an internal flexible spring supporting frame loosely contacting said body in such manner as to prevent conduction of the jars and vibrations of said body to the hand grasping said grip.

3. A handle body in combination with a flexible longitudinally compressible spring frame loosely surrounding and arranged longitudinally of said body, and a flexible hand grip enclosing said spring.

4. A steering handle having a body portion, and a hand grip surrounding and confined to said body portion and comprising a shock-absorbing flexible coiled spring surrounding and contacting said portion and an exterior cushioning body permanently surrounding and confined to said spring and held thereby from contact with said portion.

5. A steering wheel having a handle portion and a surrounding hand grip composed of cushioning flexible wire coiled around and loosely contacting the handle portion and an exterior cushioning body surrounding and in which said wire is embedded.

6. A steering wheel having a rim ring, a cushioning wire coiled around and loosely contacting said ring, and a cushioning hand grip forming body surrounding said wire and held thereby from substantial contact with said ring.

7. A steering wheel comprising a rim ring provided with and surrounded by a rubber hand grip, said rubber hand grip provided with an internal yielding spring frame forming a permanent part thereof and loosely contacting and surrounding said ring and holding the grip from substantial contact therewith.

8. A steering wheel having a rim ring forming a rigid part thereof, and a cushioning rubber hand grip surrounding said ring and provided with an interior spirally wound flexible-spring cushioning frame forming the contact surfaces of the grip with respect to the ring.

9. A steering wheel having a spider, a rim portion rigid with the spider, and a hand grip surrounding said portion and comprising a tubular body of cushioning material and a spiral cushioning compression spring permanently arranged within said tubular body and forming the operative contacting portion thereof with respect to said rim portion.

10. A steering wheel having a rim portion, a spider fixed thereto, and a rubber hand grip provided with an interior wall embodying spirally wound wire loosely surrounding and contacting said rim portion and permanently embedded in the rubber.

11. A steering wheel comprising a rim ring, spider arms, means clamping the ring to the arms embodying spacing sleeves between the arms and ring, and a tubular rubber hand grip surrounding said ring and provided with an interior spirally wound wire frame contacting the ring and maintaining the rubber from substantial engagement therewith, said rubber being molded on said frame with the frame approximately embedded in the rubber.

12. A handle for vehicle steering mechanism comprising a rim portion or bar, and a flexible cushioning hand grip arranged longitudinally thereof and loosely surrounding the same and embodying an inner flexible cushioning frame loosely engaging and movable with respect to said bar.

13. A handle for vehicle steering mechanism comprising a rim ring, and a flexible cushioning rubber hand grip surrounding said ring and loose with respect thereto, said grip being longitudinally compressible with respect to said ring.

14. A handle for vehicle steering mechanism comprising a rim ring, and a cushioning hand grip arranged thereon and embodying a coiled spring loosely surrounding and longitudinally compressible with respect to said ring, fabric enclosing said spring and an exterior body of rubber enclosing the fabric and spring.

15. A steering wheel comprising a spider, a rim ring spaced from and secured to the spider, and an exterior cushioning hand grip loosely surrounding said ring and capable of radial and circumferential play with respect thereto.

16. A steering wheel comprising radial arms, a rim ring, a series of spaced means securing the ring to the arms, and a cushioning flexible exterior hand grip enclosing said ring and embodying a flexible spring frame movable on the ring between said spaced means to absorb vibration.

EDGAR P. ELZEY.